United States Patent [19]
Humes

[11] Patent Number: 5,996,011
[45] Date of Patent: Nov. 30, 1999

[54] SYSTEM AND METHOD FOR FILTERING DATA RECEIVED BY A COMPUTER SYSTEM

[75] Inventor: Donald Creig Humes, Newport News, Va.

[73] Assignee: Unified Research Laboratories, Inc., Hampton, Va.

[21] Appl. No.: 08/823,123

[22] Filed: Mar. 25, 1997

[51] Int. Cl.[6] ................................................ G06F 13/00

[52] U.S. Cl. .......................... 709/225; 709/232; 709/206; 713/201

[58] Field of Search ...................... 395/200.47, 200.48, 395/200.49, 200.54, 200.55, 200.59, 187.01, 188.01; 707/104, 9; 709/217, 218, 219, 224, 225, 229, 232; 713/201, 202

[56] References Cited

U.S. PATENT DOCUMENTS

| | | |
|---|---|---|
| 4,839,853 | 6/1989 | Deerwester et al. . |
| 4,849,898 | 7/1989 | Adi . |
| 5,056,021 | 10/1991 | Ausborn . |
| 5,128,865 | 7/1992 | Sadler . |
| 5,255,386 | 10/1993 | Prager . |
| 5,297,039 | 3/1994 | Kanaegami et al. . |
| 5,317,507 | 5/1994 | Gallant . |
| 5,331,554 | 7/1994 | Graham . |
| 5,418,948 | 5/1995 | Turtle . |
| 5,471,610 | 11/1995 | Kawaguchi et al. . |
| 5,576,954 | 11/1996 | Driscoll . |
| 5,598,557 | 1/1997 | Doner et al. . |
| 5,706,507 | 1/1998 | Schloss .................................. 707/104 |
| 5,784,564 | 7/1998 | Camaisa et al. ................... 395/200.54 |
| 5,796,948 | 8/1998 | Cohen ................................ 395/200.55 |
| 5,825,722 | 11/1998 | Bradshaw et al. ................. 395/200.55 |
| 5,832,212 | 11/1998 | Cragun et al. ..................... 395/200.55 |
| 5,884,033 | 3/1999 | Duvall et al. ....................... 709/225 X |

OTHER PUBLICATIONS

Charkravarthy et al., "NetSurf: Using Semantic Knowledge to Find Internet Information Archives", SIGIR '95, pp. 4–11.
Voorhees, "Using WordNet to Disambiguate Word Senses for Text Retrieval", SIGIR '93, pp. 171–180.
Jacquemin et al., "Retrieving Terms and their Variants in a Lexicalized Unification–Based Framework", SIGIR '94, pp. 132–141.
"Net Nanny", Trove Investment Corporation—Home Page, pp. 1–4/www.netnanny,com.
Venditto, "Safe Computing", Internet World, Sep. 1996, pp. 49–58.
Liddy et al., "Dr–Link, Document Retrieval Using Linguistic Knowledge Project Description", pp. 39–43.
EchoSearch Homepage, pp. 1–2. http :// www.iconovex-.com/Echo/Echos.HTM.
Antonacci et al., "Capturing the deep meaning of texts through deduction and inference", IBM J. Res. Develop., vol. 36, No. 3, May 1992, pp. 333–344.
"SurfWatch ProServer from Spyglass", pp. .1–4. http://www.spyglass.com/.
Syndex: Parent's Guide, "Protecting Your Children Via Content Filtering", pp. 1–2. http://www.syndex.com:80/.
Retkwa, "Corparate Censors", Internet World, Sep. 1996, pp. 60–64.

*Primary Examiner*—Zarni Maung
*Assistant Examiner*—Patrice Winder
*Attorney, Agent, or Firm*—Larson & Taylor

[57] ABSTRACT

The present invention provides a system and method for restricting access to data received by a computer over a network by filtering certain data from the data received. In a preferred embodiment, the present invention provides a computer based method for filtering objectionable or target text data from World Wide Web pages which are received by a computer system connected to the Internet. According to the method, if the web page requested by the user contains only a minimum of objectionable or target data, the user may receive a portion of the filtered web page for downloading and viewing on his or her computer. If the web page requested contains a large amount of objectionable or target data, the invention will cause a "forbidden" page to be displayed on the user's computer monitor.

26 Claims, 5 Drawing Sheets

SYSTEM AND METHOD FOR FILTERING DATA RECEIVED BY A COMPUTER SYSTEM

BACKGROUND OF THE INVENTION

1. Field of the Invention

The present invention relates to a computer based system and method for filtering data received by a computer system and, in particular, to a computer based system and method for filtering text data from World Wide Web pages received by a computer system connected to the Internet.

2. Prior Art

While there are numerous benefits which accrue from the interconnection of computers or computer systems in a network, such an interconnection presents certain problems as well.

Broadly speaking, networks allow the various computers connected to the network to share information. Typically, if desired, access to certain information is restricted by providing access codes or the like to those individuals who are cleared to view or download the information. While this method of controlling access to information works fairly well for situations where each user is identifiable, it is very difficult to efficiently and effectively implement such a method in cases where there is a large number of unidentifiable users. Such is the situation with the vast interconnection of networks called the Internet.

The Internet is accessed by many millions of users every day and while it is somewhat possible to obtain some information with respect to identifying the computers through which a particular user accesses the Internet, it very difficult, if not impossible, to identify a particular user beyond any self-identification provided by the user himself.

By far, most of the traffic on the Internet currently occurs on the World Wide Web. On the World Wide Web, both text and graphic information is typically provided on web pages and this information is transmitted via the Hyper Text Transfer Protocol ("HTTP"). A web page has a particular address associated with it called a Uniform Resource Locator ("URL").

A typical user accesses the World Wide Web via a modem connection to a proxy/cache server which is connected to the Internet. A browser is the software program which runs on the user's computer (client computer) and allows the user to view web pages. To view a particular web page, the user inputs the URL of the desired web page into his or her browser. The browser sends the request to the proxy/cache server and the server sends the request over the Internet to the computer on which the web page resides. A header as well as a copy of the body of the web page is then sent back to the user's browser and displayed on the user's computer.

While an incredible amount of information is available on the millions of web pages provided on the World Wide Web, some of this information is not appropriate for all users. In particular, although children can be exposed to a vast number of educational and entertaining web pages, many other web pages include adult content which is not appropriate for access by children.

One method which is used to control access to these adult web pages is to require an access code to view or download particular web pages. Typically, this access code is obtained by providing some identification, often in the form of a credit card number. The obvious drawbacks of this method are: 1) such a system will invariably deny or inhibit access to many adults as well as children because many adults do not want to, or may not be able to, provide a credit card number; and 2) the system is not fool-proof because children may obtain access to credit cards, whether their's or their parents'.

Several services are available to parents and educators which provide a second method for preventing access to web pages containing adult content. These services provide software programs which contain a list of forbidden URLs. Service providers compile the list by searching the World Wide Web for web pages having objectionable material. When a user inputs a URL which appears on the forbidden list or "deny list," the program causes a message to be displayed indicating that access to that web page is forbidden. Although this method works well for denying access to web pages which are on the forbidden list, because thousands of web pages are being created and changed every day, it is simply impossible to provide an up-to-date list of every web page containing adult content. Therefore, these systems often allow children access to web pages which contain adult content but have not yet been added to the forbidden list.

A further drawback to the above-described access control systems is that they are simple admit/deny systems. That is, the user is either allowed to download and view the entire web page or he/she is forbidden from doing so. It is not practical, using either of these methods, to allow a particular user to download and view only the portions of the web page which are not objectionable.

SUMMARY OF THE INVENTION

The present invention overcomes the disadvantages of the prior art by providing a system and method for restricting access to objectionable or "target" data received by a computer over a network by filtering objectionable data from the data received. The present invention provides for filtering the data as received, so called "on the fly," so that a newly created web page may be filtered as accurately as one that has been predetermined to contain objectionable material.

Although the embodiments of the invention are described below with respect to a system and method for filtering objectionable data from the data received, it should be understood that the present invention can be applied to process any type of target data from the data received. Thus, the present invention may be utilized to process desired data such that, for instance, only Web pages containing desired information are displayed on the user's computer.

In a preferred embodiment, the present invention provides a computer based method for filtering text data from World Wide Web pages which are received by a computer system connected to the Internet. Advantageously, the method of the present invention is carried out by the computer which acts as the proxy/server through which the user's computer is connected to the Internet. However, the method can be carried out by the user's computer as well.

According to the method, if the web page requested by the user contains only a minimum of objectionable or target data, the user receives a portion of the filtered web page for downloading and viewing on his or her computer. While, if the web page requested contains a large amount of objectionable material, the invention will cause a "forbidden" page to be displayed on the user's computer monitor.

In the preferred embodiment, the request is sequentially filtered at three different levels, if necessary. First, the URL requested is filtered to determine if the web page associated with that URL has been pre-approved or pre-denied. If the URL has not be pre-approved or pre-denied, the header of the web page is then filtered to determine if the web page contains text data (such as HTML). If so, the body of the web page is filtered. While the filter will decide whether or not to block access to the entire web page based on the URL, depending on its processing of the body of the web page, the filter may deny access completely to the web page, deny access to certain portions of the web page (i.e., filter out some objectionable words), or allow complete access to the web page.

The method of the present invention first compares the requested URL to an "allow list" which contains URLs of web pages which have been approved for display to the user. If the requested URL is found in the allow list, the entire associated web page is, accordingly, forwarded to the user for downloading or viewing. If, however, the requested URL is not found in the allow list, the requested URL is then compared to a "deny list," (or "forbidden list") which functions in much the same manner as that of the prior art systems. If the requested URL is found in the forbidden list, a message is transmitted to the user's computer indicating that access to the web page is forbidden (hereinafter referred to as a "FORBIDDEN" page).

If the requested URL is found in neither the allow list or the deny list, and if the header indicates that the page contains text data, then the method provides for filtering the text of the web page, as it is either received from the network or read out of cache, to determine if it contains objectionable or target text. If the page contains objectionable text, the method determines what kind of objectionable text (specific words), how much objectionable text, and the relative groupings of objectionable text. Depending on the settings of predetermined parameters, certain objectionable words (if found) are either replaced with an innocuous filler (such as "- - - " before the web page is forwarded to the user's computer, or only a "FORBIDDEN" page is forwarded to the user's computer. The settings of the predetermined parameters may be modified by those having access to the computer program through which the computer implements the program, such as the server operator or, perhaps, the user's parent.

Optionally, the HTTP header of the web page is filtered after the URL to determine if the page contains text data and, if not, the method does not filter the web page body, since the method for filtering the web page body is only capable of filtering text or other recognizable data patterns. The method provides for filtering the text of the web page by comparing each "word" (defined by groupings of letter/number D characters) in the web page to a "dictionary." The words in the dictionary are periodically updated.

Advantageously, each word in the dictionary has a number of variables associated with it, such as: 1) a variable that indicates whether the word, if found, should be replaced with the innocuous filler (or a specific replacement filler word may be indicated); 2) a variable that indicates what category of objectionableness the word belongs to (i.e., pornography, intolerance, crime, job hunting, etc.); 3) a variable that indicates what language the word is a part of (i.e., english, french, spanish, etc.); 4) a base score variable that indicates how objectionable the word is; and 5) a bonus score variable that indicates whether the word is more objectionable when used in combination with other objectionable words. In this advantageous embodiment, the method provides for filtering the body of the web page by comparing each word in the web page with the words in the dictionary. If a word in the web page matches, then that word will either be replaced or not replaced with the filler, as indicated by the variable. A running score is determined for the entire web page, based on a particular algorithm, as the page is being filtered. If the final score for the page is above a predetermined threshold score, a "FORBIDDEN" page is forwarded to the user's computer instead.

The system of the present invention comprises a general purpose computer which is programmed to implement the method of the present invention. The computer of such a system is typically the proxy/cache server computer but it may also be the client computer or another computer.

While the preferred embodiment of the present invention is described in summary form above as applied to the filtering of web pages received over the Internet, it will be appreciated by one of ordinary skill in the art that this method is also applicable to filtering of data received by a computer from any network, including an intranet. Further, in addition to reviewing HTTP information received from the Internet, the present invention may be applied to review information posted to forms-based pages such as search engines, surveys, guest books, etc. (POST/GET data). If the words or phrases would yield objectionable results, the invention will prevent posting of the data to the remote HTTP server.

Other objects, features, and advantages of the present invention will be set forth in, or will become apparent from, the detailed description of the preferred embodiments of the invention which follows.

DETAILED DESCRIPTION OF THE PREFERRED EMBODIMENTS

Figure 1:
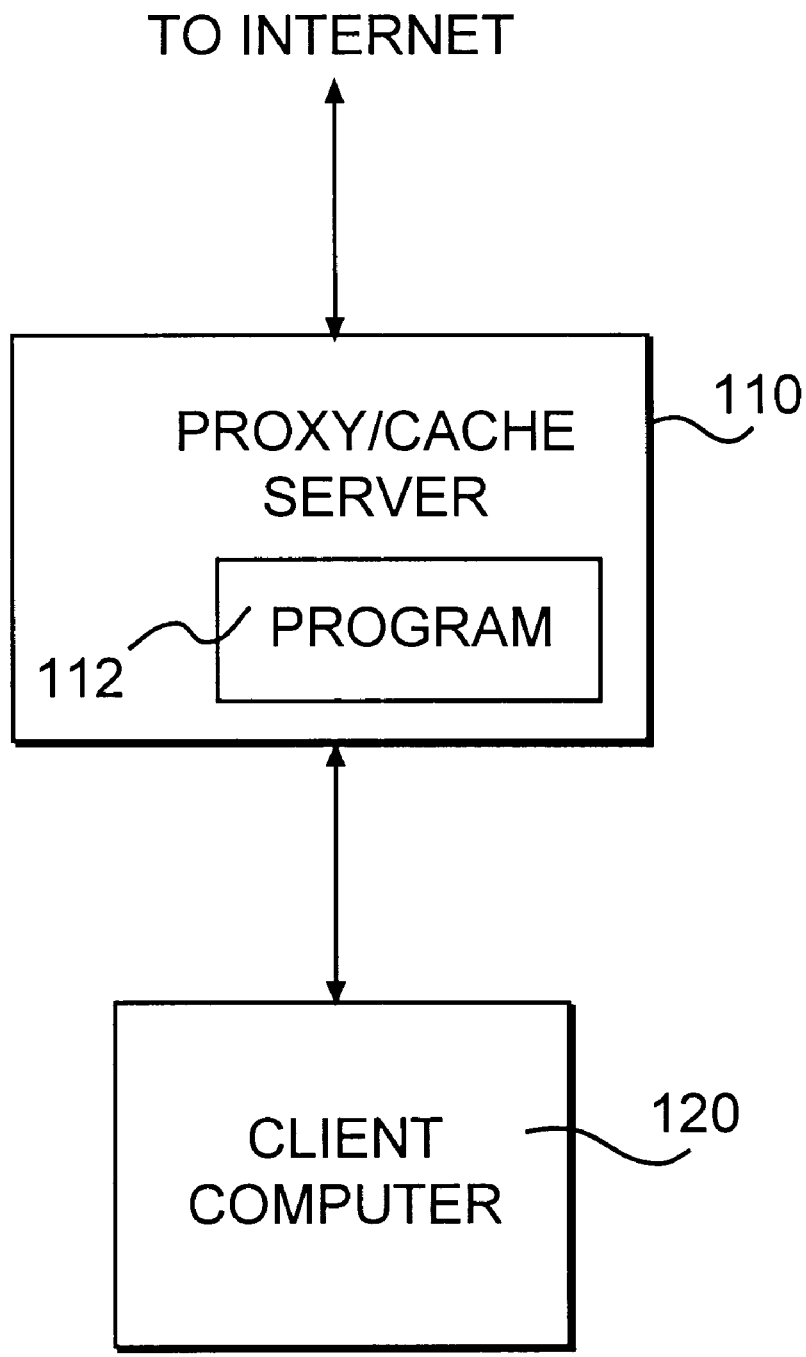
FIG. 1 shows a block diagram of a preferred embodiment of the system of the present invention.

FIG. 1 shows a block diagram of a preferred embodiment of the system of the present invention. In this embodiment, a proxy/cache server computer 110 is connected to the Internet and is capable of receiving HTTP information over the World Wide Web. A client computer 120 (user's computer) is connected to the server computer 110, typically via an ethernet or modem connection. In accordance with the present invention, server computer 110 runs a computer program 112 which programs the server computer 110 to filter any request it receives for a web page from the client computer 120 and to output to the client computer 120 only those web pages, or portions of web pages, which are deemed appropriate for viewing by the user of the client computer 120. This filtering takes place in at least three stages, as is described below relative to FIGS. 2 through 5, which illustrate the method of the present invention.

Advantageously, the proxy/cache server 110 used in the system of the present invention is a SPARC workstation made by D Sun Microsystems, Inc. and the server 110 is programmed to filter the requests in the Perl programming language. The inventors of the present invention have determined that a SPARC workstation programmed in accordance with the method set forth below, is capable of filtering at least approximately 90 KB to 500 KB of data per second, based on the speed of the CPU.

Figure 2:
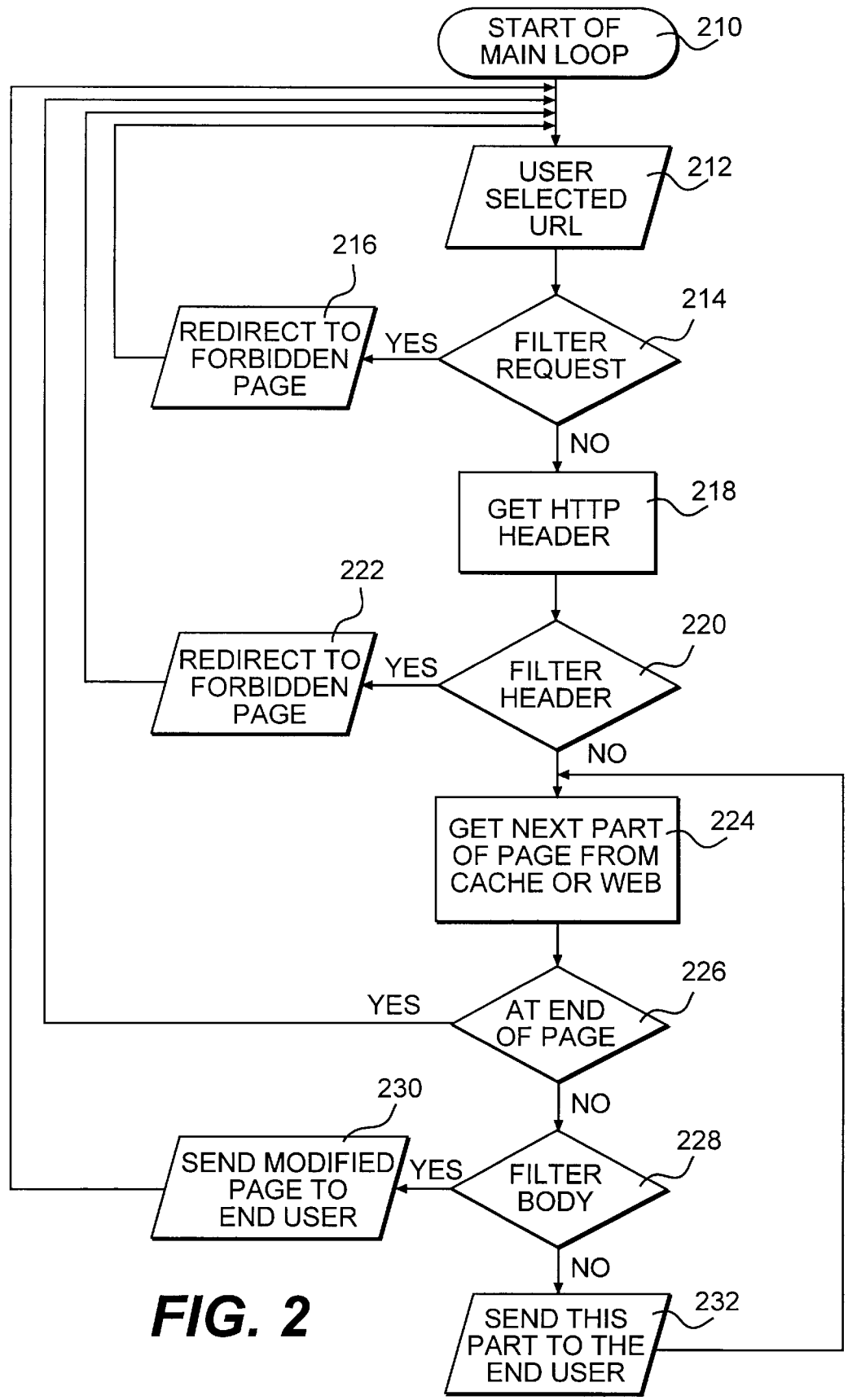
FIG. 2 is a flowchart showing the broad steps of filtering a web page URL, header, and body in accordance with one embodiment of the method of the present invention.

The flowchart in FIG. 2 shows the broad steps of filtering a requested web page URL, header, and body in accordance with one embodiment of the method of the present invention. The method begins at terminal block 210 and continues to block 212 where the user selected URL is input. The URL request is filtered at decision block 214 and the filter decision is "yes" if the request is denied based on the URL and "no" if the request is not denied at this point. If decision block 214 returns a "yes," block 216 shows that a page indicating access is forbidden ("FORBIDDEN" page) is to be returned, which page will be output to the client computer. If decision block 214 returns a "no," the HTTP header is input at block 218 and filtered at decision block 220. If decision block 220 returns a "yes," block 222 shows that the "FORBIDDEN" page is to be returned and if decision block 220 returns a "no," the first portion of the body of the web page is input at block 224.

Decision block 226 checks to see if the end of the page has been reached and, if so, the method returns to await another user selected URL. If the end of the page has not been reached, that portion of the body of the web page is filtered at decision block 228. If decision block 228 returns a "yes" (objectionable material found), then that portion of the web page is modified and, if certain rules are met, it is later sent to the client computer, indicated at block 232. If decision block 228 returns a "no," indicating no objectionable material was found in that portion of the web page body, then control is returned to block 224 where the next portion of the web page body is input.

Figure 3:
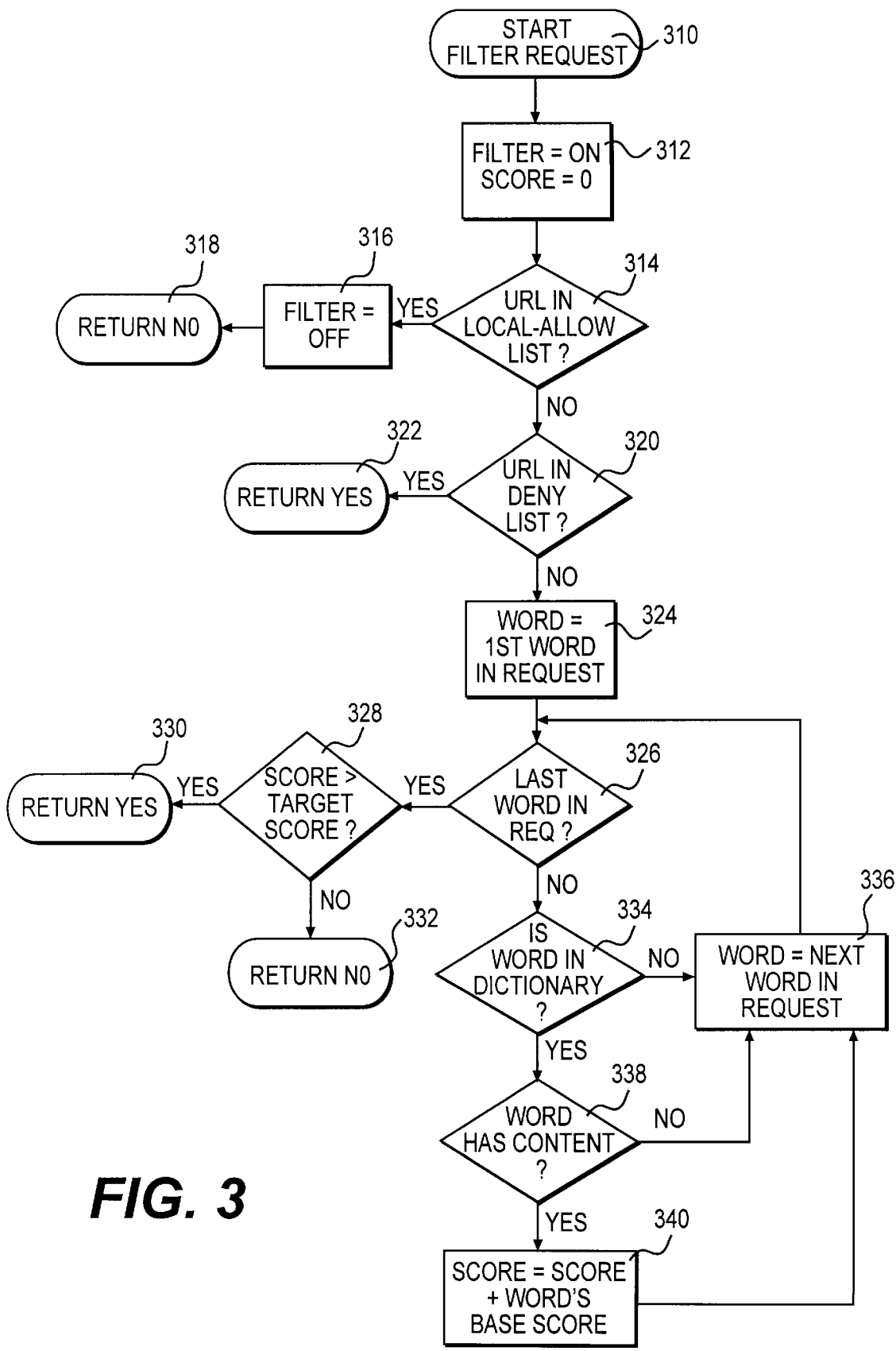
FIG. 3 is a flowchart showing the steps for filtering a URL request in accordance with the embodiment of FIG. 2.
Figure 4:
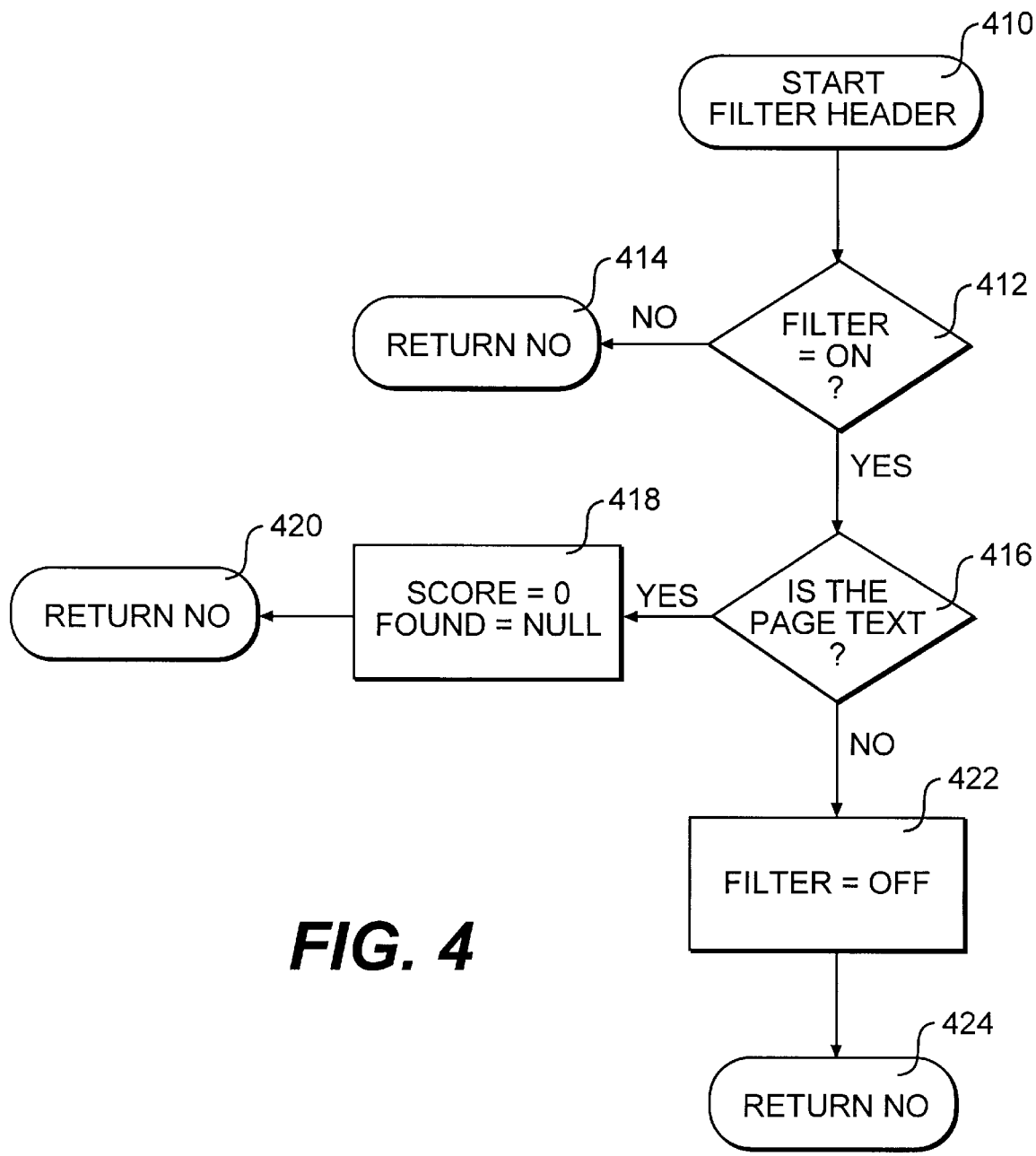
FIG. 4 is a flowchart showing the steps for filtering a web page header in accordance with the embodiment of FIG. 2.
Figure 5:
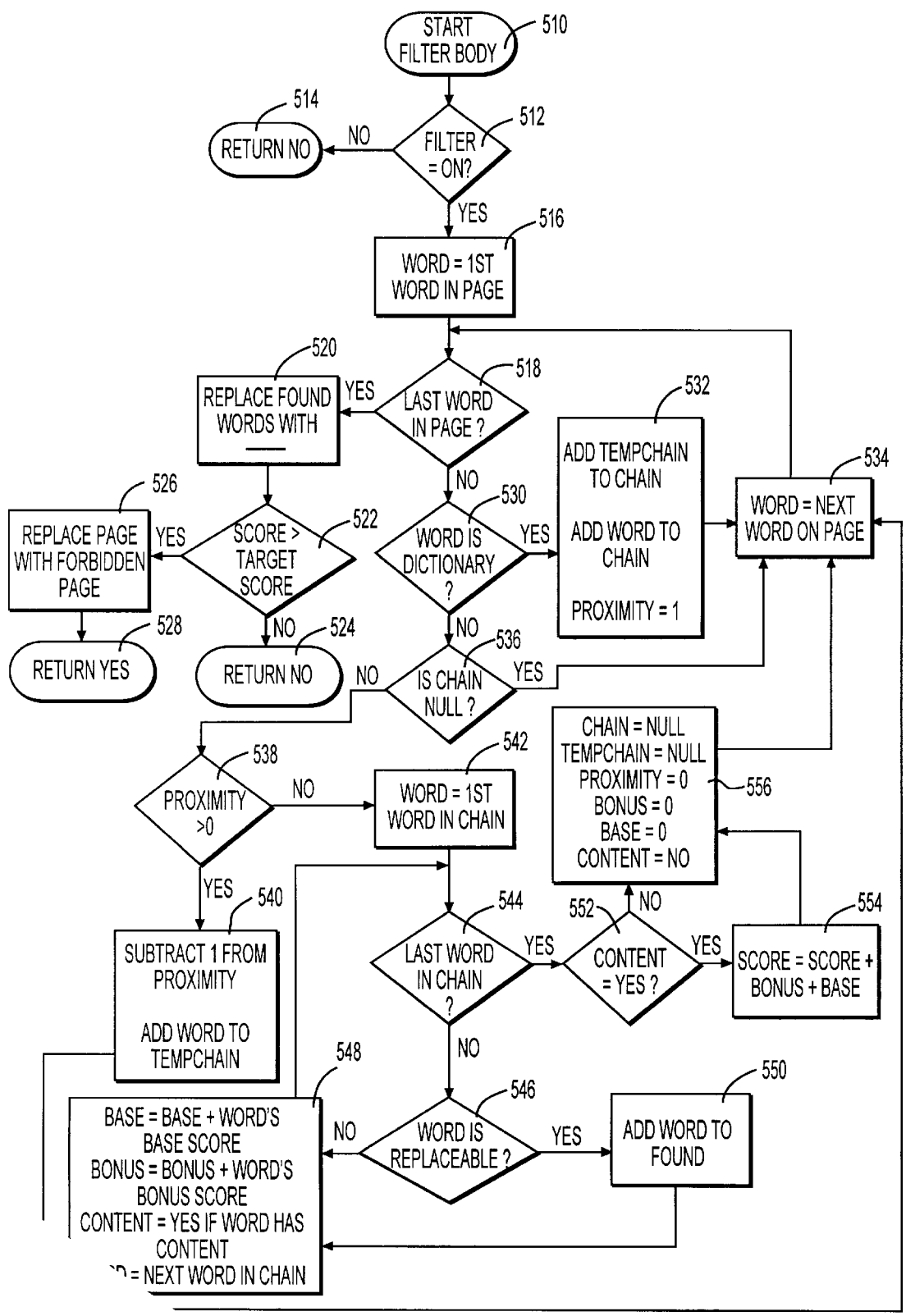
FIG. 5 is a flowchart showing the steps for filtering a web page body in accordance with the embodiment of FIG. 2.

The filters indicated in decision blocks 214, 220, and 228 are shown in the flowcharts of FIGS. 3, 4, and 5, respectively. The filters shown in FIGS. 3 and 5 are based on a method involving a dictionary, which dictionary can be updated periodically, and a score threshold for indicating whether or not a web page should be forbidden.

Each word or phrase in the dictionary has several variables associated with it. Together each word in the dictionary and its associated variables form an entry in the dictionary. In a preferred embodiment, each entry in the dictionary has the following format:

Target:Replace:Category:Language:BaseScore:BonusScore where "Target" is the objectionable or target word. "Replace" indicates whether or not the word or phrase should be replaced in the text if it is found (R=replace, N=not replace) "Category" is the category the word belongs to (e.g., pornography, intolerance, crime, violence, etc.), and "Language" is the language the word belongs to (e.g., english, french, spanish, etc.). "BaseScore" is the score the word contributes to the total score of the web page body, or portion thereof, if it is found and "BonusScore" is the additional score the word contributes to the total score if it is found in close proximity to other objectionable words. A word may be assigned a negative score, which would subtract from the total score instead of adding to it.

In the preferred embodiment, the default threshold score at which a web page will be forbidden is 50, although this score can readily be changed by anyone having the required access.

Examples of possible words and associated variables in the dictionary are as follows.

nude:N:pornography:english:5:5

This entry would be for the word "nude." "Nude," if found would not be replaced in the text (N); it is in the pornography category; it is in the english language; it has a score of 5; and it contributes a bonus score of 5 if found with other words in the dictionary.

hot:N:none:english:0:5

This entry, for the word "hot," is not to be replaced if found; is in no particular category; is in the english language; has no score; and has a bonus score of 5.

The flowchart of FIG. 3 shows the portion of the method which is represented by decision block 214 in FIG. 2, showing filtering of the URL request. This portion of the method begins at terminal block 310 and in block 312 a variable called "filter" is turned on and a variable called "score" is set to zero. The "filter" variable is used to later indicate whether the header or body of the web page should be filtered (on) or not filtered (off). "Score" is the variable which keeps track of the total score of the URL being filtered.

Decision block 314 asks whether the requested URL is in the Local-Allow list, which is a list of URLs associated with web pages that have been pre-approved so that they do not need to be filtered. In addition to speeding up transmission by allowing the request to be passed without filtering the web page, the Local-Allow list also provides for allowing full access to web pages which have text that would normally be filtered. This may prove advantageous, for instance, if a web page discusses certain objectionable text in a manner to educate children about its effects.

If the URL is in the Local-Allow list, the Filter variable is set to "Off" in block 316 and a "No" is returned in terminal block 318. If the URL is not in the Local-Allow list, decision block 320 checks to see if the URL is in the Deny List. The Deny List is a listing of URLs associated with web pages which have been predetermined to be objectionable. If the URL is in this list, terminal block 322 returns a "Yes." This Deny List feature is advantageous inter alia for designating web pages which may contain objectionable material other than text which may be filtered, such as objectionable pictures.

If the URL is not in the Deny List, the individual words in the URL and POST/GET data are then filtered. Block 324 indicates that the variable "Word" is set to the first word in the request. Decision block 326 checks to see if the last word in the request has already been filtered and, if so, decision block 328 determines whether the "Score" of the request at this point is greater than the predetermined threshold "Targetscore," which threshold may, advantageously, be changed by one having the appropriate access. If the "Score" variable is not greater than the "Targetscore" threshold, then terminal block 332 returns a "No," indicating that the page should not be forbidden. If the "Score" variable is greater than the "Targetscore" threshold, then terminal block 330 returns a "Yes," indicating the page should be forbidden. If decision block 326 indicates that the last word in the request has not already been filtered, then decision block 334 compares "Word" against the dictionary. If "Word" does not match an entry in the dictionary, then "Word" is set to the next word in the request and decision block 326 again checks to see if the last word has been filtered. If "Word" does match an entry in the dictionary, then decision block 338 determines whether "Word" has content, that is, is the category variable not set to "none" or, alternatively is the category variable set to a particular category of interest (for instance, "pornography"). If "Word" does not have content (category =none), then, in block 340, "Word" is again set to the next word in the request and, if "Word" does have content (category ≠"none" or category=a particular category), "Score" is set to the previous value of "Score"

plus the base score of the word and "Word" is then set to the next word in the request. Control returns to decision block 326.

The filtering method for the header of the web page, indicated at decision block 220 of FIG. 2, is shown in detail in FIG. 4. This method essentially determines if the page is in text (such as HTML) such that it may be effectively reviewed by the filter.

The method begins at terminal block 410 and decision block 412 determines whether the "Filter" variable is set to "On." If the "Filter" variable is not set to "On," indicating that the header should not be filtered, then terminal block 414 returns a "No." If the "Filter" variable is set to "On," then decision block 416 determines whether the page contains text data and, if so, the "Score" variable is set to zero and the "Found" variable is set to Null at block 418, and terminal block 420 returns a "No," indicating the page should not be forbidden based on the header. If decision block 416 determines that the page does not contain text data, then the "Filter" variable is set to "Off" in block 422 and terminal block 424 returns a "No."

The filtering method for the body of the web page, uses the dictionary and the variables described above, however this method introduces new variables as well which enable it to consider the proximity of the objectionable words to each other, as well as other factors, in deciding whether or not to deny access to the page.

In this method, the body of the web page is filtered one word at a time. When a word is found which is in the dictionary, a "Chain" is started. Succeeding sequential words that are found in the dictionary are included in the "Chain" and the "Chain" is ended when two words in a row are not found in the dictionary. Accordingly, these last two words are not part of the "Chain". Thus, the determination of the "Chain" length is controlled by a "Proximity" variable.

After a "Chain" is formed, it is scored. To score a "Chain," all the base scores for each word in the "Chain" are added together. The bonus scores for each word are added to the total as well, if the "Chain" contains more than one word in the dictionary. If any of the words in the "Chain" have content, i.e., category not set to "none" or category set to a particular category, then the "Chain's" score is added to the total score for the page. Advantageously, a total score is kept for each category and specific thresholds are set for each category.

If the "Replace" variable for any of the words is "R," indicating replace, then the word is replaced with an innocuous word or symbol (e.g., "- - - "). Advantageously, the "Replace" variable for each word in the dictionary may instead be an alternate word which is used to replace the objectionable word, e.g., "darn" for "damn". Such replacement words may be displayed in an alternate color.

If the total score for the page exceeds the predetermined threshold, e.g., 50, then the entire page is replaced with a "FORBIDDEN" page. In an advantageous embodiment, only words in the same language are scored together and separate thresholds are predetermined for each category.

Optionally, the "FORBIDDEN" page provides additional information, such as the total score for the page, the score of the page in each category, the language of the objectionable words in the page, etc. This information may be viewed and the thresholds may be changed by one having the appropriate access, for instance, a parent or teacher.

The examples below illustrate how the scoring of a "Chain" is accomplished.

| Sample Dictionary | | |
|---|---|---|
| hot:N:none:english:0:5 | | |
| fantasy:N:none:english:0:5 | | |
| pictures:N:none:english:0:5 | | |
| nude:N:pornography:english:5:5 | | |
| sexual:N:pornography:english:5:5 | | |
| harassment:N:none:english:0:-10 | | |
| Sample "Chain" | Score | |
| sexual fantasy | 15 | (sexual has content and multiple words from the dictionary are in the "Chain" so bonus scores count. 5 + 5 from "sexual" and 5 from "fantasy") |
| sexual harassment | 0 | (sexual has content and multiple words are in the "Chain", so bonus scores count. 5 + 5 from "sexual" and −10 from "harassment") |
| pictures | 0 | ("pictures" has no content) |
| hot pictures | 0 | (neither "hot" or "pictures" has content) |
| nude | 5 | ("nude" has content, but only one word in "Chain", so only the base score applies) |
| hot nude pictures | 20 | (3 words in "Chain", 1 with content, all base and bonus scores apply |

One embodiment of the filtering method for the body of the web page, indicated at decision block 228 of FIG. 2, is shown in detail in FIG. 5. This method uses a "Proximity" variable to indicate whether a word found to be in the dictionary is within two words of the last word found to be in the dictionary, such that it should be part of the same "Chain." Also, a "Found" list is used to keep track of all the objectionable words found which should be replaced if the web page is to be displayed. Additionally, a "Tempchain" variable allows the method to determine if the next two sequential words are actually in the dictionary before they are added to the "Chain."

The method is begun at terminal block 510 and decision block 512 determines whether the "Filter" variable is set to "On." If not (indicating that the body of the web page should not be filtered), terminal block 514 returns a "No." If "Filter" is "On," then "Word" is set to the first word in the page at block 516. Decision block 518 determines whether the last word in the page has already been filtered and, if it has, block 520 indicates that all the words in the "Found" list are replaced with the replace word (e.g., "- - - "). Decision block 522 determines whether the "Score" for the page exceeds the predetermined "Targetscore" threshold and, if so, the page is replaced with the "FORBIDDEN" page in block 526 before a "Yes" is returned by terminal block 528, indicating that access was denied based on the web page body. If the score does not exceed the "Targetscore" threshold, a "No" is returned at terminal block 524.

If decision block 518 determines that the last word in the page has not been filtered, then decision block 530 is invoked to determine if "Word" is in the dictionary. If so, "Tempchain" is added to "Chain" along with "Word" and the "Proximity" variable is set to 1, in block 532. Block 534 then sets "Word" to the next word on the page. If "Word" is not in the dictionary, then decision block 536 checks to see if "Chain" is null (i.e., contains no words) and, if it is, block 534 sets "Word" to the next word on the page. If "Chain" is not null, decision block 538 determines if "Proximity" is greater than zero. If "Proximity" is greater than zero, indicating that the last word was in the dictionary, then 1 is subtracted from "Proximity" and "Word" is added to "Tempchain" in block 540. Block 534 then sets "Word" to the next word on the page. If "Proximity" is not greater than zero, then this indicates that the last two words were not in the dictionary and thus, the "Chain" is ended. The next portion of the method scores the "Chain."

In block 542, "Word" is set to the first word in the "Chain." If that is not the last word in the "Chain," as determined in decision block 544, then decision block 546 determines whether "Word" is replaceable. If yes, then "Word" is added to the "Found" list in block 550 and control is sent to block 548. If "Word" is not replaceable, then control is sent directly to block 548. Block 548 sets: "Base Score" to the previous "Base Score" plus the "Word's" base score; "Bonus Score" to the previous "Bonus Score" plus the "Word's" bonus score; "Content" to "Yes" if the "Word" has content; and "Word" to the next word in the "Chain". Block 544 then again determines if the "Word" is the last word in the "Chain".

If "Word" is the last word in the "Chain", then decision block 552 determines if "Content" is set to "yes." If so, then block 554 sets "Score" to the previous "Score" plus the "Bonus Score" and "Base Score," as last determined in block 548. Control is then sent to block 556. If "Content" is not set to "yes," then block 556 sets: "Chain" to null; "Tempchain" to null; "Proximity" to zero; "Bonus Score to zero, "Base Score" to zero; and "Content" to "No." Block 534 then sets "Word" to the next word on the page.

One of ordinary skill in the art will recognize that the methods shown in the flowcharts of FIGS. 2 through 5 can readily be programmed into a computer using any of several computer programming languages. Advantageously, the method shown in FIG. 2 serves as the main loop of the program and the methods shown in FIGS. 3 through 5 serve as subroutines. The normal attendant initialization of variables, error checking, and the like, is programmed as required.

As noted above, while the system and method of the invention have been described with relation to filtering objectionable data from data received, the method can also be used to process data such that only Web pages containing desired data are passed to the user's computer.

Although the invention has been described in detail with respect to preferred embodiments thereof, it will be apparent to those skilled in the art that variations and modifications can be effected in these embodiments without departing from the spirit and scope of the invention.

I claim:

1. A computer readable memory containing a computer program for programming a general purpose computer to perform a method for filtering a block of text data containing words received over a network, wherein said method comprises the steps of:
   a) providing a listing of target words, each target word in said listing of target words having a respective score associated therewith, which score may be zero, wherein at least one of said target words has a negative score associated therewith;
   b) comparing each word in said block of text data to said listing to determine any word in said block of text data which matches one of said target words in said listing so as to determine matched text words and corresponding matched target words; and
   c) determining a total score for said block of text data based on said score associated with each matched target word.

2. A computer readable memory as in claim 1, further comprising:
   providing a respective replace-variable associated with each of said target words in said listing, each said replace-variable being set to either a true state or a false state; and
   replacing each said word in said block of text data that matches one of said target words in said listing having its respective replace-variable set to a true state with a replacement-word to provide a new block of text data.

3. A computer readable memory as in claim 1, further comprising
   replacing said block of text data with a substitute block of data if said total score for said block of text data exceeds a predetermined numerical threshold.

4. A computer readable memory as in claim 3, wherein said score associated with each of said target words in said listing comprises a base score and a bonus score, and wherein said negative score associated with said at least one of said target words comprises a negative bonus score and wherein said method further comprises determining said total score for said block of text data based on the respective bonus score associated with at least one of said matched target words.

5. A computer readable memory as in claim 4, wherein said method further comprises determining said total score for said block of text data based on the respective bonus score associated with each of said matched target words having a corresponding matched text word that is positioned within a predetermined proximity of another matched text word in said block of text data.

6. A computer readable memory as in claim 5, wherein said predetermined proximity comprises adjacent words.

7. A computer readable memory as in claim 5, wherein said predetermined proximity comprises a separation of at most one word.

8. A computer based method for filtering a block of text data containing words received over a network, said method comprising the steps of:
   a) providing a listing of target words, each target word in said listing of target words having a respective score associated therewith, which score may be zero, wherein at least one of said target words has a negative score associated therewith;
   b) comparing each word in said block of text data to said listing to determine any word in said block of text data which matches one of said target words in said listing so as to determine matched text words and corresponding matched target words; and
   c) determining a total score for said block of text data based on said score associated with each matched target word.

9. A computer based method as in claim 8, further comprising:
   providing a respective replace-variable associated with each of said target words in said listing, each said replace-variable being set to either a true state or a false state; and
   replacing each said word in said block of text data that matches one of said target words in said listing having its respective replace-variable set to a true state with a replacement-word, to provide a new block of text data.

10. A computer based method as in claim 8, further comprising replacing said block of text data with a substitute block of data if said total score for said block of text data exceeds a predetermined numerical threshold.

11. A computer based method as in claim 10, wherein said score associated with each of said target words in said listing comprises a base score and a bonus score and wherein said negative score associated with said at least one of said target words comprises a negative bonus score, and wherein said total score for said block of text data is determined based on the respective bonus score associated with at least one of said matched target words.

12. A computer based method in claim 11, wherein said total score for said block of text data is determined based on the respective bonus score associated with each of said matched target words having a corresponding matched text word that is positioned within a predetermined proximity of another matched text word in said block of text data.

13. A computer based method as in claim 12, wherein said predetermined proximity comprises adjacent words.

14. A computer based method as in claim 12, wherein said predetermined proximity comprises a separation of at most one word.

15. A computer based method as in claim 8, further comprising:
   d) providing a respective category-variable associated with each of said target words in said listing for expressing a category with which each of said target words in said listing is associated; and
   e) providing an output comprising a record of the respective categories with which each matched target word is associated.

16. A computer based method as in claim 15, further comprising:
   determining a total category score for said block of text data based on the respective score and category-variable associated with each matched text word; and
   providing said total category score for each category in said output.

17. A computer based method as in claim 16, further comprising:
   replacing said block of text data with a substitute block of data if said total category score for a category exceeds a predetermined numerical threshold.

18. A computer based method for filtering a web page received over the World Wide Web and providing an output, said web page having a header portion, a body portion and an associated requested URL, said method comprising the steps of:
   a) providing an allow-list of URLs associated with approved web pages;
   b) providing a deny-list of URLs associated with disapproved web pages;
   c) providing a listing of target words;
   d) comparing said requested URL with said URLs in said allow-list, and if said requested URL matches any of said URLs in said allow-list, providing the web page as an output;
   e) if said requested URL does not match any of said URLs in said allow-list, comparing said requested URL with said URLs in said deny-list, and, if said requested URL matches any of said URLs in said deny-list, providing an output indicating access to the web page is forbidden;
   f) if said requested URL does not match any of said URLs in said deny-list, providing a computer based filter for comparing each word in the header of the web page to said listing to determine any word in the header of the web page which matches one of said target words in said listing; and
   g) providing an indication that access to the web page is forbidden or providing a modified version of the web page as an output based upon said determination in step f.

19. A computer based method as in claim 18, further comprising:
   h) providing a computer based filter for comparing each word in the body of the web page to said listing to determine any word in the body of the web page which matches one of said target words in said listing; and
   i) providing an indication that access to the web page is forbidden or providing a modified version of the web page as an output based upon said determination in step h.

20. A computer system for filtering a block of text data containing words received over a network, comprising:
   a general purpose computer; and
   a set of instructions for programming said general purpose computer to:
   a) provide a listing of target words, each target word in said listing of target words having a respective score associated therewith, which score may be zero, wherein at least one of said target words has a negative score associated therewith;
   b) compare each word in said block of text data to said listing to determine any word in said block of text data which matches one of said target words in said listing so as to determine matched text words and corresponding matched target words; and
   c) determining a total score for said block of text data based on said score associated with each matched target word.

21. A computer system as in claim 20, wherein said general purpose computer is further programmed in step c to:
   provide a respective replace-variable associated with each of said target words in said listing, each said replace-variable being set to either a true state or a false state; and
   replace each said word in said block of text data that matches one of said target words in said listing having its respective replace-variable set to a true state with a replacement-word to provide a new block of text data.

22. A computer system as in claim 20, wherein said general purpose computer is further programmed to replace said block of text data with a substitute block of data if said total score for said block of text data exceeds a predetermined numerical threshold.

23. A computer system as in claim 22, wherein said score associated with each of said target words in said listing comprises a base score and a bonus score, and wherein said negative score associated with said at least one of said target words comprises a negative bonus score and wherein said total score for said block of text data is determined based on the respective bonus score associated with each of said matched target words having corresponding matched text word that is positioned within a predetermined proximity of another matched text word.

24. A computer readable memory containing a computer program for programming a general purpose computer to perform a method for filtering a block of text data containing words received over a network, wherein said method comprises the steps of:

a) providing a listing of target words, each target word in said listing of target words having a respective score and bonus score associated therewith, which score and/or bonus score may be zero;

b) comparing each word in said block of text data to said listing to determine words in said block of text data which match one of said target words in said listing so as to determine matched text words and associated matched target words;

c) determining a total score for said block of text data based on:
   (i) said score associated with each matched target word and
   (ii) said bonus score associated with each matched target word only if said matched target word's associated matched text word is within a predetermined proximity to another matched text word in said block of text data.

25. A computer based method for filtering a block of text data containing words received over a network, said method comprising:

a) providing a listing of target words, each target word in said listing of target words having a respective score and bonus score associated therewith, which score and/or bonus score may be zero;

d) comparing each word in said block of text data to said listing to determine words in said block of text data which match one of said target words in said listing so as to determine matched text words and associated matched target words;

e) determining a total score for said block of text data based on:
   (i) said score associated with each matched target word and
   (ii) said bonus score associated with each matched target word only if said matched target word's associated matched text word is within a predetermined proximity to another matched text word in said block of text data.

26. A computer based method for filtering a page of data received over the World Wide Web, wherein said page of data comprises a plurality of blocks of text data, said method comprising:

a) providing a listing of target words, each target word in said listing of target words having a respective score associated therewith, which score may be zero;

b) comparing each word in one of said blocks of text data to said listing to determine words in said first one of said blocks of text data which match one of said target words in said listing so as to determine matched text words and associated matched target words;

c) determining a total score for said one of said blocks of text data based on said score associated with each matched target word;

d) replacing said one of said blocks of text data with a substitute block of data if said total score for said one of said blocks of text data exceeds a predetermined numerical threshold;

e) displaying said one of said blocks of text data or said substitute block of data;

f) repeating steps a through e for each remaining block of text data in said page of data.

* * * * *

(12) EX PARTE REEXAMINATION CERTIFICATE (9633rd)
United States Patent
Humes

(10) Number: US 5,996,011 C1
(45) Certificate Issued: May 7, 2013

(54) SYSTEM AND METHOD FOR FILTERING DATA RECEIVED BY A COMPUTER SYSTEM

(75) Inventor: Donald Creig Humes, Newport News, VA (US)

(73) Assignee: Symantec Corporation, Cupertino, CA (US)

Reexamination Request:
No. 90/009,858, Dec. 3, 2010

Reexamination Certificate for:
Patent No.: 5,996,011
Issued: Nov. 30, 1999
Appl. No.: 08/823,123
Filed: Mar. 25, 1997

(51) Int. Cl.
*G06F 15/173* (2006.01)

(52) U.S. Cl.
USPC .... 709/225; 709/206; 709/232; 707/E17.109; 726/13

(58) Field of Classification Search
None
See application file for complete search history.

(56) References Cited

To view the complete listing of prior art documents cited during the proceeding for Reexamination Control Number 90/009,858, please refer to the USPTO's public Patent Application Information Retrieval (PAIR) system under the Display References tab.

*Primary Examiner* — Rachna Desai

(57) ABSTRACT

The present invention provides a system and method for restricting access to data received by a computer over a network by filtering certain data from the data received. In a preferred embodiment, the present invention provides a computer based method for filtering objectionable or target text data from World Wide Web pages which are received by a computer system connected to the Internet. According to the method, if the web page requested by the user contains only a minimum of objectionable or target data, the user may receive a portion of the filtered web page for downloading and viewing on his or her computer. If the web page requested contains a large amount of objectionable or target data, the invention will cause a "forbidden" page to be displayed on the user's computer monitor.

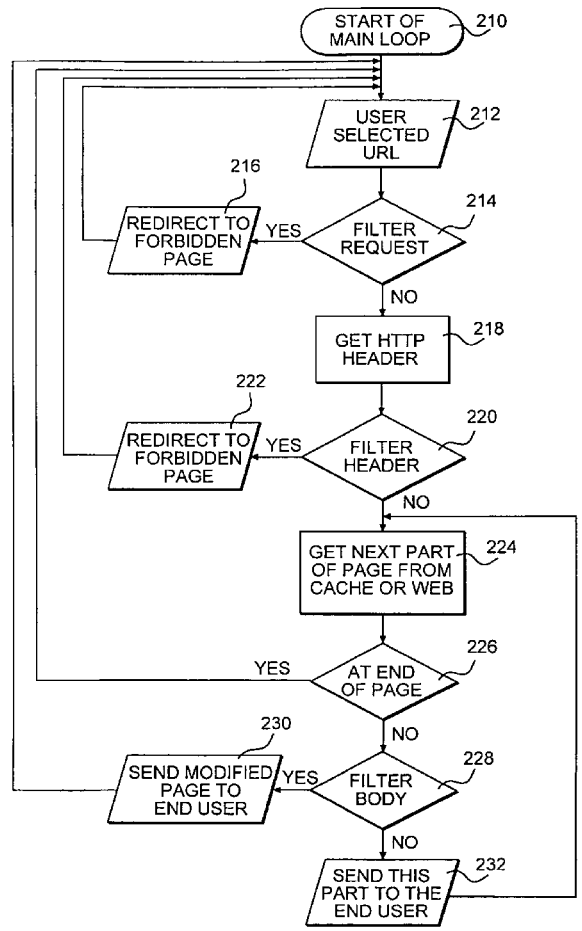

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 9 and 21 is confirmed.

Claims 1, 3-8, 10-20 and 22-26 are cancelled.

New claims 27-41 are added and determined to be patentable.

*27. A proxy cache server programmed to perform a method for filtering a block of text data containing words received over a network, wherein said method comprises the steps of:*
  *a) providing a listing of target words each target word in said listing of target words having a respective score associated therewith, which score may be zero, wherein at least one of said target words has a negative score associated therewith;*
  *b) comparing each word in said block of text data to said listing to determine any word in said block of text data which matches one of said target words in said listing so as to determine matched text words and corresponding matched target words;*
  *c) determining a total score for said block of text data based on said score associated with each matched target word;*
  *d) providing a respective replace-variable associated with each of said target words in said listing, each said replace-variable being set to either a true state or a false state; and*
  *e) replacing each said word in said block of text data that matches one of said target words in said listing having its respective replace-variable set to a true state with a replacement-word to provide a new block of text data.*

*28. A proxy cache server as in claim 27, further configured to:*
  *replace said block of text data with a substitute block of data if said total score for said block of text data exceeds a predetermined numerical threshold.*

*29. A proxy cache server as in claim 28, wherein said score associated with each of said target words in said listing comprises a base score and a bonus score, and wherein said negative score associated with said at least one of said target words comprises a negative bonus score and wherein said method further comprises determining said total score for said block of text data based on the respective bonus score associated with at least one of said matched target words.*

*30. A proxy cache server as in claim 29, wherein said method further comprises determining said total score for said block of text data based on the respective bonus score associated with each of said matched target words having a corresponding matched text word that is positioned within a predetermined proximity of another matched text word in said block of text data.*

*31. A proxy cache server as in claim 30, wherein said predetermined proximity comprises adjacent words.*

*32. A proxy cache server as in claim 30, wherein said predetermined proximity comprises a separation of at most one word.*

*33. A computer based method for filtering a block of text data containing words received over a network, said method comprising the steps of:*
  *a) providing a listing of target words, stored in electronic storage, each target word in said listing of target words having a respective score associated therewith, which score may be zero, wherein at least one of said target words has a negative score associated therewith;*
  *b) comparing, using at least one computer processor, each word in said block of text data to said listing in electronic storage to determine any word in said block of text data which matches one of said target words in said listing so as to determine matched text words and corresponding matched target words;*
  *c) determining a total score for said block of text data based on said score associated with each matched target word;*
  *d) providing a respective replace-variable associated with each of said target words in said listing, each said replace-variable being set to either a true state or a false state;*
  *e) comparing at least one of said words in said block of text data and replacing at the least one of said words in said block of text data that matches one of said target words in said listing having its respective replace-variable set to a true state with a replacement-word, to provide a new block of text data; and*
  *f) comparing at least a second one of said words in said block of text data and ignoring the at least a second one of said words in said block of text data that matches one of said target words in said listing having its respective replace-variable set to a false state.*

*34. A computer based method as in claim 33, further comprising:*
  *replacing said block of text data with a substitute block of data if said total score for said block of text data exceeds a predetermined numerical threshold.*

*35. A computer based method as in claim 33, wherein said score associated with each of said target words in said listing comprises a base score and a bonus score and wherein said negative score associated with said at least one of said target words comprises a negative bonus score, and wherein said total score for said block of text data is determined based on the respective bonus score associated with at least one of said matched target words.*

*36. A computer based method in claim 34, wherein said total score for said block of text data is determined based on the respective bonus score associated with each of said matched target words having a corresponding matched text word that is positioned within a predetermined proximity of another matched text word in said block of text data.*

*37. A computer based method as in claim 35, wherein said predetermined proximity comprises adjacent words.*

*38. A computer based method as in claim 35, wherein said predetermined proximity comprises a separation of at most one word.*

*39. A computer based method as in claim 33, further comprising:*
  *d) providing a respective category-variable associated with each of said target words in said listing for expressing a category with which each of said target words in said listing is associated; and* e) providing an output comprising a record of the respective categories with which each matched target word is associated.

40. A computer based method as in claim 38, further comprising:

determining a total category score for said block of text data based on the respective score and category-variable associated with each matched text word; and providing said total category score for each category in said output.

41. A computer based method as in claim 39, further comprising:

replacing said block of text data with a substitute block of data if said total category score for a category exceeds a predetermined numerical threshold.

* * * * *